(12) United States Patent
Venkumahanti et al.

(10) Patent No.: US 9,804,969 B2
(45) Date of Patent: Oct. 31, 2017

(54) SPECULATIVE ADDRESSING USING A VIRTUAL ADDRESS-TO-PHYSICAL ADDRESS PAGE CROSSING BUFFER

(71) Applicant: QUALCOMM Incorporated, San Diego, CA (US)

(72) Inventors: Suresh K. Venkumahanti, Austin, TX (US); Jiajin Tu, Austin, TX (US); Phillip M. Jones, Georgetown, TX (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 13/721,442

(22) Filed: Dec. 20, 2012

(65) Prior Publication Data

US 2014/0181459 A1    Jun. 26, 2014

(51) Int. Cl.
| G06F 12/1027 | (2016.01) |
| G06F 12/10 | (2016.01) |
| G06F 12/1009 | (2016.01) |
| G06F 9/38 | (2006.01) |
| G06F 12/1045 | (2016.01) |

(52) U.S. Cl.
CPC ........ *G06F 12/1027* (2013.01); *G06F 9/3816* (2013.01); *G06F 12/10* (2013.01); *G06F 12/1009* (2013.01); *G06F 12/1054* (2013.01); *G06F 2212/654* (2013.01); *G06F 2212/655* (2013.01)

(58) Field of Classification Search
CPC .............................. G06F 12/10; G06F 12/1009
USPC ........................................................ 711/207
See application file for complete search history.

(56) References Cited

U.S. PATENT DOCUMENTS

| 5,278,963 | A | 1/1994 | Hattersley et al. |
| 5,548,739 | A | 8/1996 | Yung |
| 6,678,815 | B1 | 1/2004 | Mathews et al. |
| 7,509,472 | B2 | 3/2009 | Caprioli et al. |
| 8,140,768 | B2 | 3/2012 | Speight et al. |
| 8,239,657 | B2 | 8/2012 | Kopec et al. |
| 2003/0093686 | A1* | 5/2003 | Barnes et al. ................ 713/200 |
| 2003/0131212 | A1 | 7/2003 | Liptay et al. |
| 2004/0068618 | A1* | 4/2004 | Hooker ......................... 711/141 |
| 2006/0248279 | A1* | 11/2006 | Al-Sukhni .......... G06F 12/0862 711/137 |
| 2007/0005933 | A1* | 1/2007 | Kopec et al. ................. 711/207 |
| 2008/0189506 | A1* | 8/2008 | Kopec ..................... G06F 12/04 711/201 |

(Continued)

FOREIGN PATENT DOCUMENTS

EP    0424163 A2    4/1991

OTHER PUBLICATIONS

International Search Report and Written Opinion—PCT/US2013/077068—ISA/EPO—May 20, 2014.

*Primary Examiner* — Prasith Thammavong
(74) *Attorney, Agent, or Firm* — Qualcomm Incorporated (57) ABSTRACT

A method includes receiving an instruction to be executed by a processor. The method further includes performing a lookup in a page crossing buffer that includes one or more entries to determine if the instruction has an entry in the page crossing buffer. Each of the entries includes a physical address. The method further includes, when the page crossing buffer has the entry in the page crossing buffer, retrieving a particular physical address from the entry in the page crossing buffer.

24 Claims, 6 Drawing Sheets

(56) References Cited

U.S. PATENT DOCUMENTS

| | | | |
|---|---|---|---|
| 2008/0222384 A1* | 9/2008 | Wang et al. ................... | 711/207 |
| 2009/0216993 A1* | 8/2009 | Venkumahanti .......... | G06F 9/34 |
| | | | 711/206 |
| 2012/0290817 A1* | 11/2012 | Olson ................... | G06F 9/3806 |
| | | | 712/205 |

* cited by examiner

SPECULATIVE ADDRESSING USING A VIRTUAL ADDRESS-TO-PHYSICAL ADDRESS PAGE CROSSING BUFFER

I. FIELD

The present disclosure is generally related to a computer architecture for processing.

II. DESCRIPTION OF RELATED ART

When accessing a sequence of instructions (e.g. a first instruction followed by a second instruction), a processing system may translate a virtual address for an instruction to a physical address for the instruction. The processing system may include an instruction translation lookaside buffer (ITLB) that enables the processor to translate a virtual address to a physical address. The processing system may request the ITLB to perform an address translation operation to translate a virtual address associated with the instruction to a physical address. The physical address translated for the instruction may be used to access the instruction (e.g., to fetch an instruction) from an instruction cache. The processing system may send the physical address to the instruction cache to perform a tag array operation to determine whether the instruction is stored in a data array of the instruction cache. The instruction cache may perform a data array operation to retrieve the instruction based on a result of the tag array operation.

The processing system may perform addressing of an instruction by initiating a tag array operation using a speculative address for a next instruction (sequential instruction) that is to be accessed (e.g., fetched). The tag array operation may be performed before an ITLB address translation for the next instruction has completed. The processing system may designate a last physical address buffer that stores a physical address of a previous instruction (provided by the ITLB) for use as a speculative physical address for the next instruction. By performing a tag array operation for the next instruction using the speculative physical address, a delay associated with an address translation operation performed by the ITLB for the next instruction can be bypassed. However, the processing system may encounter delays by using the speculative physical address to access the next instruction. For example, when a first instruction is a branch instruction and a second instruction is a "target" of the branch instruction that resides at a different memory page than the first instruction, the speculative address of the second instruction that is provided to the tag array may be invalid. As another example, when a first instruction and a second instruction are at sequential memory addresses, but the current instruction is at a last address of one memory page and the second instruction is at a first address of a next memory page, a speculative physical address of the second instruction (based on the physical address of the current instruction) will be invalid.

As a result of the speculative address of the second address being invalid, the processing system may have to retrieve a valid physical address of the second instruction from the ITLB. The processing system then replays the instruction which may include flushing the processing system instruction fetch pipeline and re-initiating an instruction fetch by performing another tag array operation with a valid physical address of the second instruction. Performing a replay of an instruction causes processing delays and consumes the processing system's resources.

III. SUMMARY

To reduce instruction processing delays, such as due to instruction replay, a processing system may perform speculative addressing using a page crossing buffer (PCB). The PCB may be used to perform speculative addressing during a processing stage (e.g., a pre-fetch stage) of a particular instruction (e.g., a first instruction) to avoid a processing delay of a next instruction (e.g., a second instruction) to be processed by the processing system. For example, the second instruction may be predicted to cause an instruction fetch replay when the second instruction is located at a different memory page than a memory page that includes the first instruction. The processing system may have to cross a memory page boundary by accessing the first instruction at a first memory page and then accessing the second instruction at a second memory page that is different from the first memory page.

Each entry of the PCB may correspond to a virtual address of a particular instruction (e.g., a first instruction) and may include a physical address (i.e. a "target" physical address) that corresponds to a next instruction e.g., a second instruction) to be processed after the particular instruction. The target physical address may be a valid physical address identifying a location of the next instruction. The target physical address may correspond to an instruction that is predicted to cause a processing delay, such as by being located on a memory page that is different from a memory page that includes the particular instruction corresponding to the particular PCB entry.

In particular embodiments, before the processing system uses the PCB to perform speculative addressing for instructions, one or more entries may be stored within the PCB. The target physical address corresponding to each of the entries stored in the PCB may be predetermined to cause a processing delay. In one example, the one or more new entries correspond to a target physical address of an instruction that has been identified as causing a processing delay in the processing system. In another example, an entry in the PCB may be updated during operation of the processing system after the target physical address in the entry is identified as being an incorrect physical address of an instruction. In this case, the entry may be updated with a correct physical address of the instruction that may be obtained from an instruction translation lookaside buffer.

During processing of a first instruction, the processing system may perform speculative addressing using the PCB to determine whether a second instruction (a next instruction) to be processed is predicted to cause a processing delay. The processing system may determine whether the PCB has an entry corresponding to a virtual address of the first instruction. When the PCB has an entry corresponding to the first instruction, the target physical address corresponding to the identified entry may be predicted to cause a processing delay. That is, the target physical address of the second instruction may be located on a different memory page, such that the processing system may have to cross a memory page boundary to access the second instruction. Without using the PCB to perform speculative addressing, the processing system may incur a processing delay, such as a delay due to an instruction fetch replay related to a memory page boundary that may be encountered to access the second instruction. For example, the processing system may perform an instruction replay in attempting to access the second instruction, using a last physical address of a most recently accessed instruction (e.g., the first instruction). An instruction fetch replay may be performed because the last physical address of the most recently accessed instruction cannot be used to determine addressability to the second instruction, which is located on a different memory page than the most recently accessed instruction. Performing an instruction cache tag array operation based on the last physical address of a most recently accessed instruction may not provide addressability to locate a tag array corresponding to the second instruction. As a result, an instruction fetch replay is performed to provide correct addressability.

The processing system may avoid the processing delay by using the target physical address of the PCB entry to access the second instruction. The target physical address of the PCB entry may correspond to an instruction that is identified as occurring after a first instruction that is predicted to cause an instruction delay. Because the target address may correspond to a target physical address that is predicted to be a correct physical address of the second instruction, the processing system may perform a tag array operation based on the correct physical address of the second instruction. For example, the processing system may use the target physical address to perform an instruction cache tag array operation to locate a tag array entry corresponding to the second instruction. As a result, the instruction cache may be able to load a cache line corresponding to the second instruction, where the tag array identified from the tag array operation can be used in the fetch stage to retrieve the second instruction from a data array portion of an instruction cache without incurring the instruction fetch delay. Thus, by accessing the second instruction using the PCB entry, the processing system may avoid having to replay the second instruction Which may include flushing the processing system instruction fetch pipeline and performing another tag array operation with a valid physical address of the second instruction.

In a particular embodiment, a method includes receiving an instruction to be executed by a processor. The method further includes performing a lookup in a page crossing buffer (PCB) that includes one or more entries to determine if the instruction has an entry in the PCB. Each of the entries in the PCB includes a physical address. The method further includes, when the page crossing buffer (PCB) has the entry in the page crossing buffer, retrieving a particular physical address from the entry of the page crossing buffer. The particular physical address retrieved from the entry of the PCB may be used to perform speculative addressing of a second instruction, such as performing a tag array operation on the second instruction based on the particular physical address.

In another particular embodiment, an apparatus includes a page crossing buffer (PCB) including one or more entries. Each of the one or more entries includes a physical address. The apparatus further includes a tag array. The apparatus further includes a multiplexer configured to select a particular physical address retrieved from the page crossing buffer in response to the page crossing buffer having an entry corresponding to a particular instruction. An output of the multiplexer is provided to the tag array.

In another particular embodiment, a non-transitory computer readable medium stores instructions that are executable within a processing system to cause the processing system to receive a particular instruction for execution. The instructions are further executable to perform a lookup in a page crossing buffer (PCB) that includes one or more entries to determine if the particular instruction has an entry in the PCB. Each of the entries includes a physical address. The instructions are further executable to, when the page crossing buffer (PCB) has the entry in the PCB, retrieve a particular physical address from the entry of the page crossing buffer. The particular physical address retrieved from the entry of the PCB may be used to perform speculative addressing of a second instruction, such as performing a tag array operation on the second instruction based on the particular physical address.

In another particular embodiment, an apparatus includes means for storing one or more entries, each of the one or more entries including a physical address. The apparatus includes means for performing a tag array operation. The apparatus includes means for selecting an address that corresponds to a particular physical address retrieved from the means for storing in response to the means for storing having an entry corresponding to a particular instruction. An output of the means for selecting an address is provided to the means for performing a tag array operation.

Particular advantages provided by at least one of the disclosed embodiments include reducing processing delays associated with accessing instructions to be executed by a processor, such as instructions that are separated by a memory page boundary which can cause the processor to incur an instruction fetch replay. Another particular advantage includes improving speculative addressing of instructions by using a virtual-to-physical address page crossing buffer to determine whether a next particular instruction may be predicted to cause a processing delay. The page crossing buffer may provide a physical address that can be used to perform speculative addressing of a next particular instruction that has been predicted to cause a processing delay.

Other aspects, advantages, and features of the present disclosure will become apparent after review of the entire application, including the following sections: Brief Description of the Drawings, Detailed Description, and the Claims.

V. DETAILED DESCRIPTION

Particular embodiments of the present disclosure are described below with reference to the drawings. In the description, common elements are designated by common reference numbers throughout the drawings.

Figure 1:
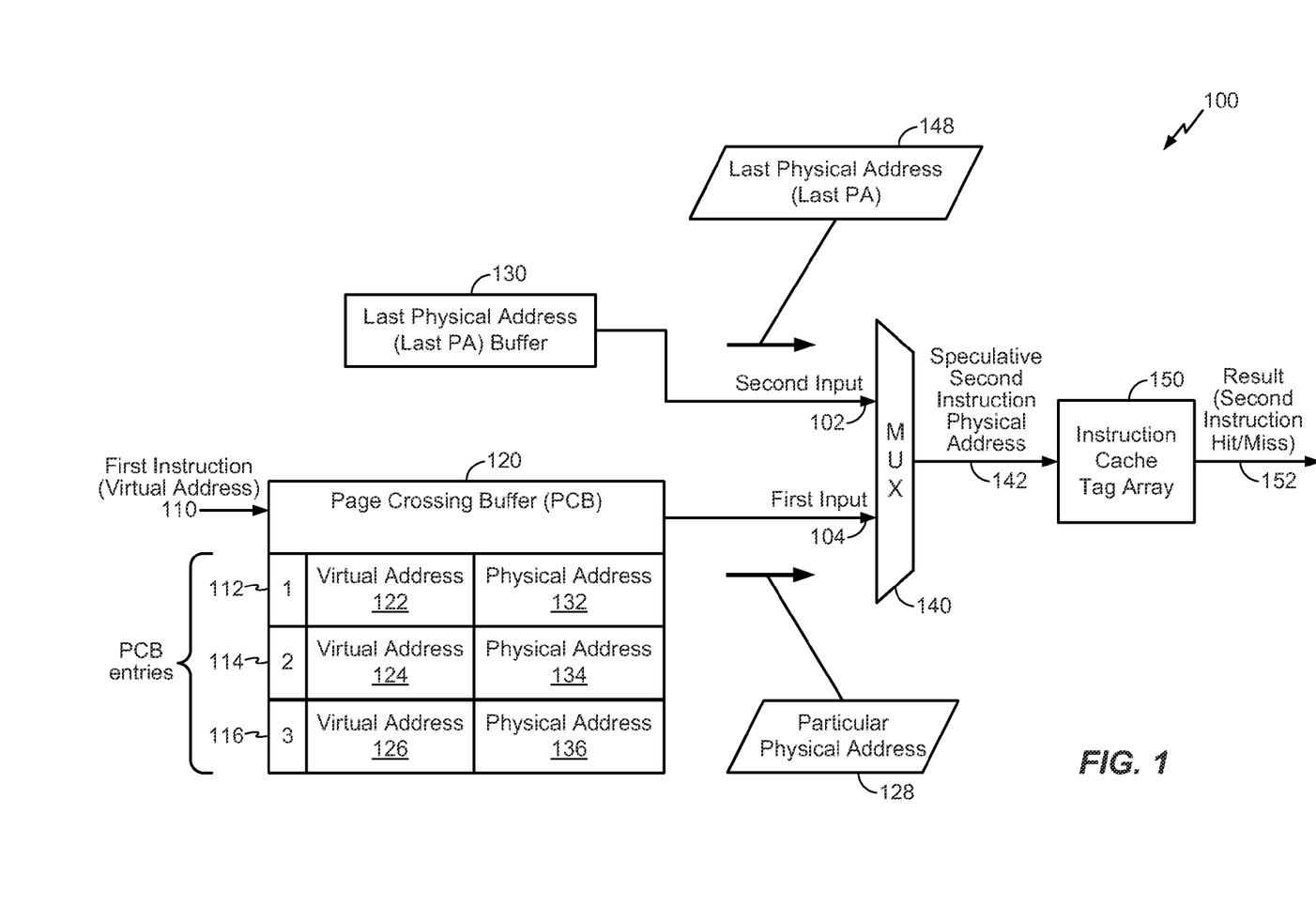
FIG. 1 is a block diagram of a first embodiment of an apparatus to perform speculative addressing using a page crossing buffer.

Referring to FIG. 1, a block diagram of a first embodiment of an apparatus configured to perform speculative addressing using a page crossing buffer is illustrated and generally designated 100. In a particular embodiment, the apparatus 100 may be included in a processor. In another particular embodiment, the apparatus 100 may be implemented as or operatively connected to a processing system that includes at least one processor.

The apparatus 100 may include a page crossing buffer (PCB) 120 that stores one or more entries. Each PCB entry (e.g., the first PCB entry 112, the second PCB entry 114, or the third PCB entry 116) may correspond to a virtual address of a particular instruction and may include a physical address (e.g., a "target" physical address). The physical address may correspond to a next instruction (e.g., a second instruction) to be processed. The virtual address and the physical address in each PCB entry may correspond to different memory pages. For example, a first PCB entry 112 includes a virtual address (VA) 122 and a physical address (PA) 132. Similarly, a second PCB entry 114 includes a virtual address 124 and a corresponding physical address 134. A third PCB entry 116 includes a virtual address 126 and a corresponding physical address 136.

In a particular embodiment, the one or more entries 112-116 in the PCB 120 may be pre-stored before instruction processing begins. A target physical address 132-136 corresponding to each of the entries 112-116 stored in the PCB 120 may be predetermined to cause a processing delay. For example, a target physical address may have been identified as causing: a processing delay during a prior instance when an instruction associated with the target physical address was accessed. In other particular embodiments, one or more new entries may be stored or updated in the PCB 120 during processing of instructions, such as during a pre-fetch stage. In one example, the one or more new entries may correspond to a target physical address of an instruction that has been identified to cause a processing delay.

In another example, one of the entries 112-116 in the PCB 120 may be updated after a target physical address of an entry has been identified as containing an incorrect target physical address of an instruction predicted to cause a processing delay. The identified entry may be updated with a correct physical address of the instruction, which may be obtained from an instruction translation lookaside buffer.

In a particular embodiment, use of the PCB 120 may be limited to speculative addressing of instructions that have been predicted to cause an instruction fetch replay due to accessibility of the instructions involving a crossing of a memory page boundary. That is, in each entry of the PCB 120, an instruction corresponding to the virtual address of an entry may be located on a first memory page and an instruction corresponding to the physical address of the entry may be located on a second memory page that is different than the first memory page. An instruction is accessible from physical memory (e.g., main memory) via a physical memory page ("a memory page"), which contains a sequence of instructions. Each of the instructions is addressable according to a physical address. A physical memory page corresponds to a contiguous, fixed-length block in physical memory where the contents of the physical memory page are located. In a particular embodiment, the PCB 120 is limited (e.g., dedicated) to storing entries that include or identify a virtual address and a target physical address that correspond to different memory pages.

The apparatus 100 may include a last physical address (Last PA) buffer 130 that is configured to store information indicating a last physical address (Last PA) 148. The Last PA 148 may correspond to a physical address of a most recently accessed (e.g., most recently fetched) instruction.

A multiplexer (MUX) 140 may be included in the apparatus 100. The MUX 140 may be configured to receive a first input 104 that may correspond to a particular physical address 128. The particular physical address 128 may be one of the physical addresses 132-136 corresponding to one of the PCB entries 112-116. The MUX 140 may be configured to receive a second input 102 that may correspond to the Last PA physical address 148 stored in the Last PA Buffer 130. The MUX 140 may be configured to select the first input 104 (e.g., the particular physical address 128) or the second input 102 (e.g., the Last PA 148). An output of the MUX 140 may be a speculative second instruction physical address 142 that corresponds to a second instruction, such as an instruction that may be fetched after the first instruction 110. The MUX 140 may be configured to select one of the received inputs 102, 104 based on a value specified by a control input that is further described with reference to FIG. 2.

The apparatus 100 may include an instruction cache tag array 150. The instruction cache array 150 may be a part of an instruction cache (not shown). The instruction cache tag array 150 may be operatively coupled to the MUX 140 and configured to receive the speculative second physical address 142 output from the MUX 140. The instruction cache tag array 150 may contain addresses (or portions of addresses) of one or more instructions contained in the cache and indexed by the instruction cache tag array 150. The instruction cache tag array 150 may perform a tag array operation to determine whether the received physical address matches an entry in the tag array. The instruction cache tag array 150 may be configured to generate a result 152 (e.g., a logic value 0 or a logic value 1) indicating a hit or a miss of the tag array operation performed for the received input (e.g., the speculative second physical address 142). The result 152 may indicate whether a hit or miss resulted from the tag array operation using the speculative second instruction physical address 142 output from the MUX 140.

During operation, the first instruction 110 may be received for execution by a processor. The PCB 120 may be used to perform speculative addressing to determine whether a predicted delay may occur during processing of a second instruction (not shown) to be processed for execution after the first instruction 110. For example, the predicted delay may be an instruction fetch delay that occurs during instruction fetching for a second instruction that, when processed, may involve crossing a memory page boundary to a different memory page to access the second instruction. Speculative addressing may be performed during processing of the first instruction 110, such as during a pre-fetch stage, by using the PCB 120.

To determine whether a predicted delay may occur, a lookup in the PCB 120 may be performed to determine whether one of the PCB entries 112-116 has an entry corresponding to the first instruction 110. Identifying an entry that corresponds to the first instruction 110 may indicate the second instruction is associated with a predicted delay. Determining whether the PCB 120 has an entry corresponding to the first instruction may including determining whether the virtual address of the first instruction 110 matches a virtual address (e.g., the virtual address 122, the virtual address 124, or the virtual address 126) corresponding to a particular PCB entry of the entries 112-116. When a PCB entry corresponding to the first instruction 110 is located, the particular physical address 128 corresponding to the PCB entry is output from the PCB 120.

The particular physical address 128 (e.g., a physical address of the second instruction) may correspond to a physical address (e.g., the physical address 132, the physical address 134, or the physical address 136) of a particular PCB entry that matches the virtual address of first instruction 110. Each of the physical addresses 132-136 may correspond to a particular instruction (e.g., a second instruction) that may encounter a predicted processing delay (e.g., an instruction fetch replay) during processing of the particular instruction. The particular physical address 128 corresponding to the identified particular PCB entry matching the virtual address of the first instruction 110 may be used to perform speculative addressing for the second instruction.

A speculative physical address (e.g., the speculative second instruction physical address 142) may be selected to be used to perform speculative addressing for the second instruction. The MUX 140 may selectively output the input 102 or the input 104 as the speculative second instruction physical address 142. The speculative second instruction physical address 142 may be a physical address corresponding to the second instruction. The MUX 140 may be controlled based on an output of the PCB 120 as described in further detail with respect to FIG. 2. For example, when the first instruction 110 does not have an entry in the PCB 120, the MUX 140 outputs the Last PA 148 from the Last PA buffer 130.

The speculative second instruction physical address 142 output by the MUX 140 is provided to the instruction cache tag array 150 to perform a tag array operation. The tag array operation may determine whether an instruction corresponding to the speculative second instruction physical address 142 is loaded in the instruction cache. The tag array operation may be a speculative tag array operation because the physical address 142 of the second instruction is a speculative physical address identified based on a prior instruction (e.g., the Last PA 148 or the particular PCB entry from the PCB having the first instruction). The tag array operation may produce the result 152 that indicates whether a hit or miss has occurred in the instruction cache tag array 150. In response to a miss, a cache line corresponding to the physical address may be retrieved from memory and the instruction cache may be updated to include the retrieved cache line.

By identifying an entry located in the tag array based on the speculative physical address of the second instruction (based on a lookup operation at the PCB 120), an instruction processing delay such as an instruction fetch replay may be avoided. For example, a processor may avoid an instruction fetch replay during a fetch stage of processing for the second instruction when the second instruction is located on a different memory page than the first instruction as compared to a system that performs speculative pre-fetching based on the Last PA 148 only. By performing a speculative tag array operation based on the speculative second instruction physical address 142, a cache line corresponding to the speculative physical address 142 of the second instruction may be retrieved during a pre-fetch stage. Retrieving the cache line corresponding to the physical address of the second instruction prior to a fetch stage may cause a replay to be avoided during the fetch stage because the instruction cache will be updated to include the cache line for the second instruction. The tag array lookup result of the speculative tag array operation performed, using the speculative physical address 142 may be used in the fetch stage to retrieve the second instruction from a data array portion (not shown) of an instruction cache (not shown) without incurring instruction fetch delay because the cache line for the second, instruction is loaded in the instruction cache.

Figure 2:
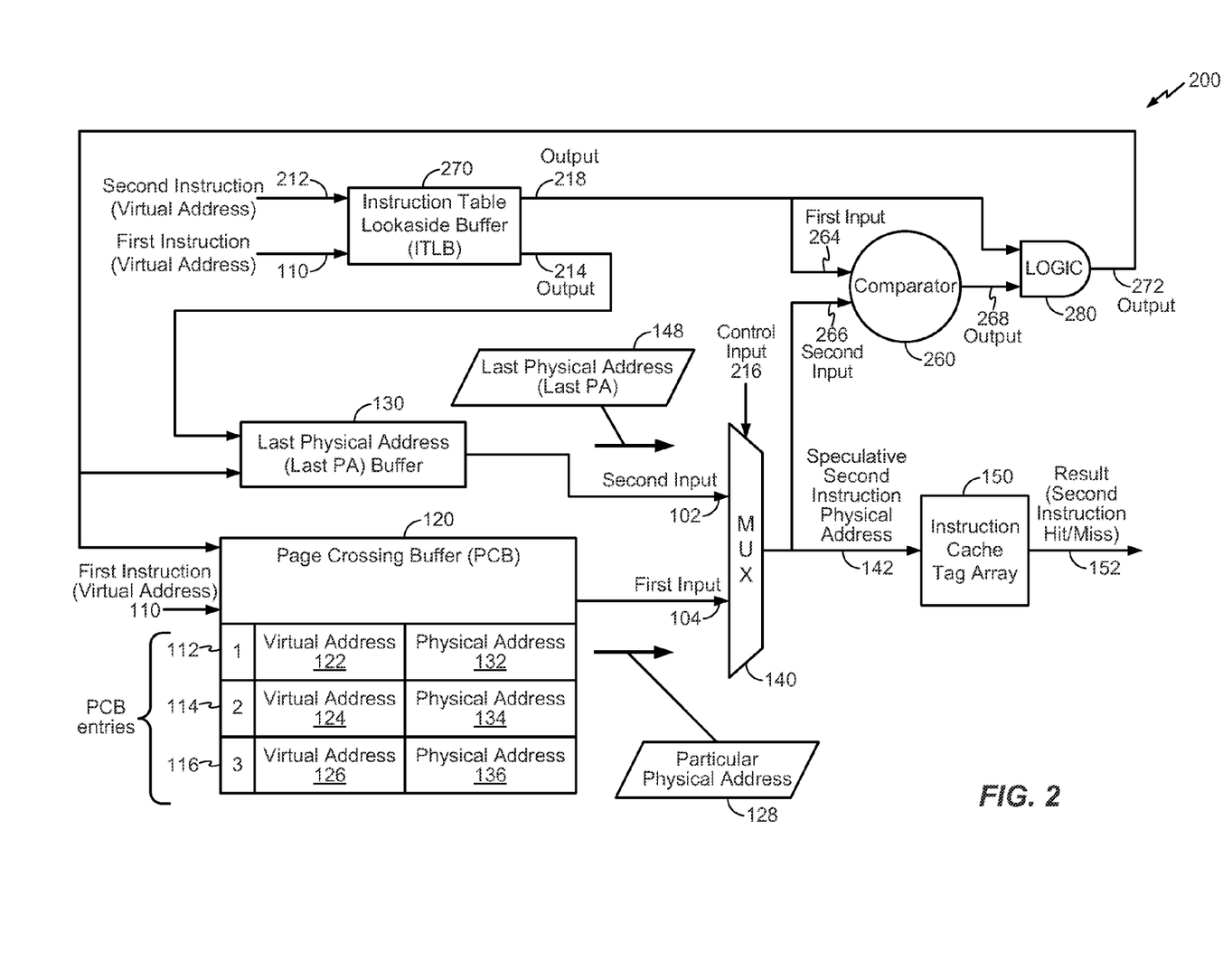
FIG. 2 is a block diagram of a second particular embodiment of an apparatus to perform speculative addressing using a page crossing buffer.

Referring to FIG. 2, a block diagram of a second particular embodiment of an apparatus configured to perform speculative addressing using a page crossing buffer is illustrated and generally designated as 200. The apparatus 200 includes the PCB 120, the Last PA buffer 130, the MUX 140, and the instruction cache tag array 150 of FIG. 1. The apparatus 200 also includes a comparator 260, an instruction table lookaside buffer (ITLB) 270, and logic 280. In a particular embodiment, the apparatus 200 may be included in a processor. In another particular embodiment, the apparatus 200 may be implemented as or operatively connected to a processing system that includes at least one processor. The apparatus 200 may perform speculative addressing using the PCB 120 during processing of an instruction (e.g., the first instruction 110).

The apparatus 200 may include or may be configured to access the ITLB 270 to perform an operation to translate a virtual address associated with an instruction to a physical address. An output 218 of the ITLB 270 may correspond to a result of performing an ITLB operation to translate a virtual address associated with a second instruction 212 to a physical address. An output 214 of the ITLB 270 may correspond to a result of performing an ITLB operation to translate a virtual address associated with the first instruction 110 to a physical address. Although the ITLB 270 is illustrated as having two outputs 214, 218, the ITLB 270 may generate a single output for each ITLB operation. For example, the output 214 and the output 218 may be generated in sequential translation operations (rather than concurrent translation operations). Although the ITLB 270 is illustrated as having two outputs 214, 218, the ITLB may be configured to produce one or more additional outputs (not shown) corresponding to a result of performing all ITLB operation for one or more additional instructions. Although FIG. 2 depicts the ITLB 270 to perform address translation, in other embodiments, virtual-to-physical address translation may be performed via page table access, address computation, or one or more other techniques.

The comparator 260 is configured to perform a comparison of a physical address (e.g., the output 218) corresponding to the output 218 of the translation by the ITLB 270 of the second instruction 212 to a speculative physical address 142 for the second instruction 212 to determine whether the speculative physical address 142 matches a correct physical address for the second instruction 212. The comparator 260 may be configured to receive a first input 264 that corresponds to the output 218 (the physical address of the second instruction) of an ITLB operation performed by the ITLB 270 for the second instruction 212. The comparator 260 may be configured to receive a second input 266 that corresponds to the speculative second instruction physical address 142 output by the MUX 140. The comparator 260 may be configured to perform a comparison of the first input 264 (the output 218) to the second input 266 (the speculative second instruction physical address 142) to produce an output 268 indicating a result of the comparison. For example, the comparator 260 may output a '1' when the first input 264 and the second input 266 match, and may output a '0' otherwise.

The logic 280 is configured to selectively output 272 a correct physical address of the second instruction 212 based on whether the speculative second instruction 142 is the correct physical address of the second instruction 212. The output 272 may be used as a correct physical address of the second instruction 212, which can be used as a last physical address of a last recently accessed instruction to perform speculative addressing for subsequent instructions (e.g., a third instruction). The logic 280 may be configured to receive the output 268 of the comparator and a correct physical address of the second instruction provided by the output 218. Responsive to the output 268 of the comparator, the logic 280 is configured to select the output 218 of the translation by the ITLB 270 of the second instruction 212 as the output 272 when the Output 268 indicates that the speculative second instruction physical address 142 does not match the output 218. The logic 280 may include or be implemented as an AND logic gate.

In a particular embodiment, the Last PA buffer 130 may be updated to store the speculative second instruction physical address 142 when the speculative second instruction physical address 142 is generated. In the event the speculative second instruction physical address is incorrect, the Last PA 148 may be updated in the Last PA buffer 130 responsive to the output 272 of the logic 280. In another embodiment, the Last PA buffer 130 may be updated based on the output of the ITLB 270, such as the output 214.

In a particular embodiment, the PCB 120 may be configured to be updated with a result (e.g., the output 218) of the ITLB operation performed for the second instruction 212. For example, one of the PCB entries 112-116 of FIG. 1 may be updated such that the result 218 of the ITLB operation is stored as the physical address corresponding to one of the PCB entries 112-116 having the virtual address of the first instruction 110. In a particular embodiment, the PCB 120 may be updated with the result 218 of the ITLB operation for the second instruction 212 provided by the output 272 of the logic 280 when the comparator 260 determines a misprediction has occurred. Updating an entry in the PCB 120 with a correct physical address of the second instruction 212 may enable speculative addressing to be performed with the correct physical address when the second instruction 212 is to be fetched again after the first instruction 110. When the second instruction 212 is to be fetched again after the first instruction 110, speculative addressing for the second instruction 212 may be performed based on the PCB entry matching the first instruction 110, which may contain the most recently updated physical address of the second instruction 212.

During operation, the first instruction 110 may be received for execution by a processor and speculative addressing may be performed to determine whether a predicted delay may occur during processing of a second instruction predicted to follow the first instruction 110. The PCB 120 may be accessed to determine whether one of the PCB entries 112-116 has a virtual address corresponding to the first instruction 110, which may indicate that the second instruction 212 is associated with a predicted delay. The physical address (e.g., the particular physical address 128 of FIG. 1) corresponding to a particular PCB entry of the PCB entries 112-116 having a virtual address of the first instruction 110 may be used to perform speculative addressing for the second instruction 212.

The ITLB 270 may perform an ITLB operation to translate the virtual address of the first instruction 110 to a correct physical address 214 of the first instruction 110. In a particular embodiment, the apparatus may use the Last PA buffer 130 to store a physical address corresponding to the last instruction received for execution by a processor (if any). As such, the Last PA buffer 130 may be updated with a physical address of the first instruction 110. In a particular embodiment, the Last PA buffer 130 may store the output 214 corresponding to the result 214 of the ITLB operation for the first instruction 110. By storing a correct physical address of a most recently accessed instruction (e.g., the first instruction 110), a next instruction (e.g., the second instruction 212) may be selected from the Last PA buffer 130 when the next instruction is not predicted to cause a delay based on the PCB 120. For example, when the second instruction 212 is not predicted to cause a delay because the PCB 120 does not have an entry that matches the most recently accessed instruction (e.g., the first instruction 110), the MUX 140 may select the Last PA 148 as the output 142. The output 142 is a physical address of the most recently accessed instruction, which may be used to access the second instruction 212. Because the second instruction 212 is not predicted to cause a delay, the second instruction 212 may be located in sequence after the first instruction 110 on a shared memory page. Thus, the second instruction 212 may be accessed from the shared memory page based on the Last PA 148 in the output 142.

The MUX 140 may be responsive to a control input 216 to select the second input 102 or the first input 104 to output as the speculative second instruction physical address 142. For example, the MUX 140 may select the first input 104 when the control input 216 has a '1', which indicates that the first instruction has an entry in the PCB 120. In another example, when the first instruction 110 does not have an entry in the PCB 120, the control input 216 has a '0'. When the control input 216 has a '0', the MUX 110 does not select the first input 104 and selects the second input 102, corresponding to the output (e.g., the Last PA 148) of the Last PA buffer 130, as the output 142 to a tag array operation.

In response to the speculative second instruction physical address 142 output by the MUX 140, the instruction cache tag array 150 may perform a tag array operation to determine whether the speculative second instruction physical address 142 is loaded in the instruction cache. The tag array operation may produce the result 152 that indicates whether a hit or miss has occurred in the instruction cache tag array 150.

While speculative pre-fetching is ongoing for the second instruction 212 using the speculative second instruction physical address 112, the second instruction 212 may be received and provided as input to the ITLB 270 to perform an ITLB operation to translate the virtual address of the second instruction 212 to a physical address. The output 218 corresponding to the result of the ITLB operation for the second instruction 212 may be provided as the first input 264 to the comparator 260. The result (e.g., the output 218) of the ITLB operation for the second instruction 212 may be used to determine whether the speculative second instruction physical address 142 is correct.

The comparator 260 may perform a comparison of the ITLB output 218 for the second instruction at the first input 264 of the comparator 260 to the speculative second instruction physical address 142 for the second instruction at the second input 266 of the comparator 260. The result of the comparison performed at the comparator 260, represented by the output 268, may indicate whether the speculative second instruction physical address 142 associated with the second input 266 is correct. Based whether the output 268 indicates the speculative second instruction 142 is correct, a determination may be made whether to replay the tag array operation performed by the instruction cache tag array 150 for the second instruction 212. The tag array operation for the second instruction 212 may be replayed when the speculative second instruction physical address 142 is not correct.

In a particular embodiment, the second instruction 212 may be replayed based on the output 272 of the logic 280.

A replay of the second instruction 212 may include flushing an instruction fetch pipeline of a processor that executes the second instruction 212 and re-initiating an instruction fetch for the second instruction 212 by performing another tag array operation with a correct physical address of the second instruction 212. A determination as to whether the second instruction 212 is to be replayed may be based on whether the output 272 indicates that the speculative second instruction physical address 142 is correct. The second instruction 212 may be replayed when the output 272 indicates that the speculative second instruction physical address 142 is not correct. For example, the output 272 may contain a value of zero and the second instruction 212 may not be replayed when the speculative second instruction physical address 142 is correct. When the speculative second instruction physical address 142 is not correct, the second instruction 212 may be replayed and the output 272 may have a value that is a correct physical address of the second instruction 212 that corresponds to the output 218.

In a particular embodiment, a result of the ITLB operation for the second instruction 212, such as the output 218, may be stored in the Last PA buffer 130. Updating the Last PA buffer 130 with a valid address of the second instruction 212 may enable instructions processed after the second instruction to be selected via the input 102 by the MUX 140 to perform speculative addressing for a later instruction using the Last PA 148 in the Last PA buffer 130. Alternately, the output 218 may be stored in the Last PA buffer 130 based on determining that the speculative second instruction address 142 is invalid. Storing a valid physical address for the second instruction 212 in the Last PA buffer 130 may allow the second instruction 212 to be correctly fetched during a replay of the second instruction 212 using the Last PA buffer 130. In a particular embodiment, based on determining that the speculative second instruction 142 is invalid, the output 272 of the logic 280 may be stored in the Last PA buffer 130.

In a particular embodiment, a result of the mil operation for the second instruction 212, such as the output 218, may be stored in an entry of the PCB 120. For example, one of the PCB entries 112-116 may be updated such that the result of the ITLB operation is stored as the physical address corresponding to one of the PCB entries 112-116 having the virtual address of the first instruction 110. In a particular embodiment, the PCB 120 may be updated with the output 272 (e.g., the output 218 of the ITLB operation for the second instruction 212) of the logic 280 based on determining that the speculative second instruction 142 is not valid. By updating a particular entry of the PCB 120 with the physical address of the second instruction determined based on the result of the ITLB operation, speculative addressing for another occurrence of the second instruction 212 may be performed with a most recently valid physical address.

By updating a last physical address buffer with a valid address of an instruction predicted to cause a processing delay, a processing system may at least reduce processing delays from being incurred related to an incorrect physical address of a previous instruction. Performing a comparison of a speculative physical address of an instruction identified in a PCB entry to a valid physical address obtained from an ITLB may enable a processing system to determine whether to update the PCB when the comparison indicates that the speculative physical address is not valid. Thus, the processing system may provide greater certainty that the PCB used to perform speculative addressing may enable the processing system to successfully avoid a processing delay.

Figure 3:
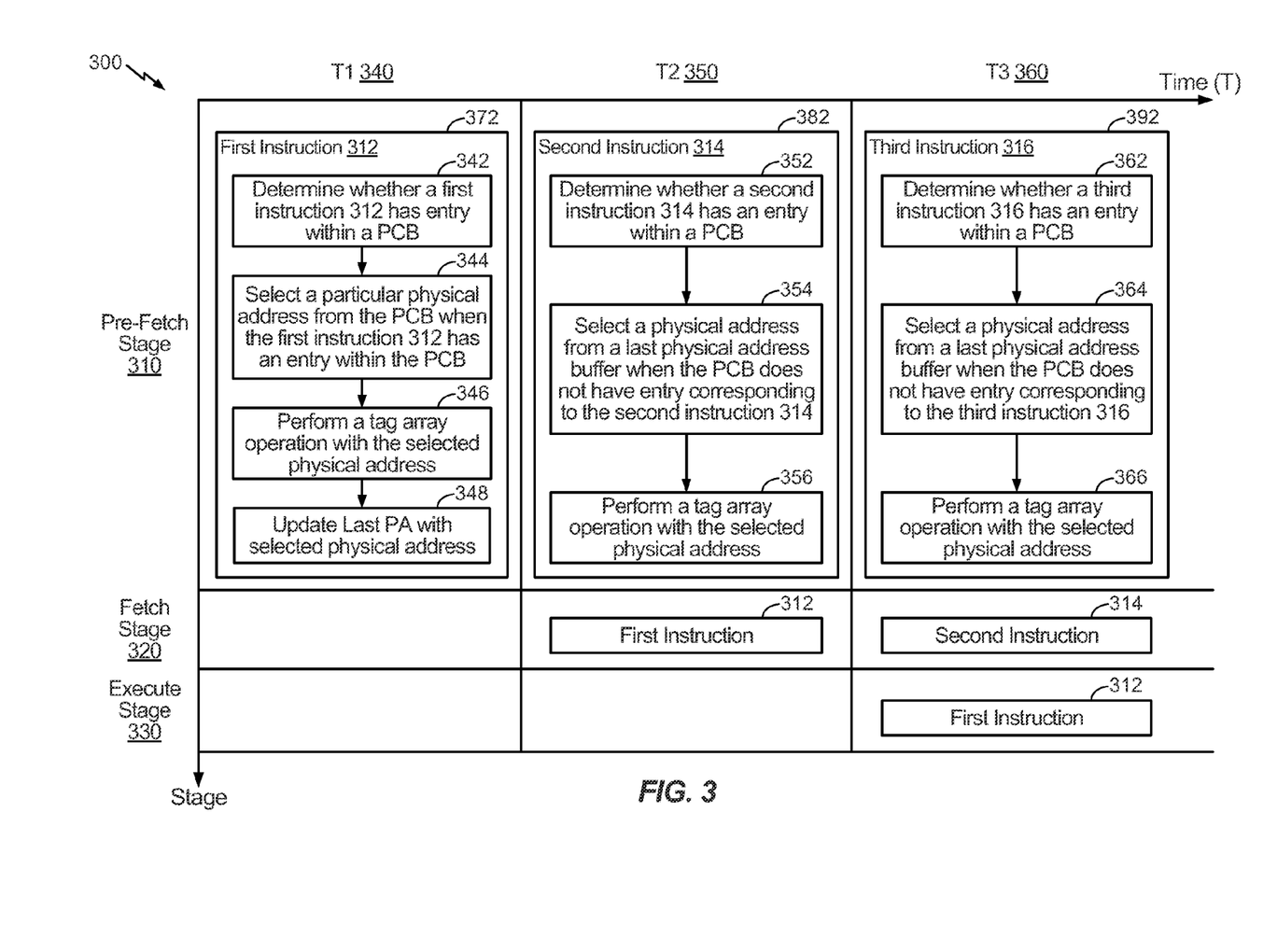
FIG. 3 is a diagram illustrating an example of a particular embodiment of pipelined processing for a set of instructions including speculative addressing using a page crossing buffer.

Referring to FIG. 3, a diagram 300 illustrating an example of a particular embodiment of pipelined processing including speculative addressing for a set of instructions (e.g., a first instruction 312, a second instruction 314, and a third instruction 316) using a page crossing buffer (PCB). The diagram 300 illustrates states of a pre-fetch stage 310, a fetch stage 320, and an execute stage 330 for each of multiple time periods (T) including a first time period (T1) 340, a second time period (T2) 350, and a third time period (T3) 360. Each of the time periods T1 340, T2 350, and T3 360 may correspond to one or more clock cycles or pipeline cycles of a processor. Methods for speculative addressing of each of the set of instructions 312-316 may be performed during a respective pre-fetch stage 310 of instruction processing. Processing of a particular instruction of the set of instructions in the pre-fetch stage 310 may occur after the particular instruction has been received by a processor to be processed for execution. The pre-fetch stage 310 may be earlier in pipeline processing for a particular instruction than the fetch stage 320 and the execute stage 330. Although not illustrated in the diagram 300, other instructions may be received for processing during the time periods T1 340, T2 350, and T3 360 when the set of instruction 312-316 are processed in the pre-fetch stage 310, the fetch stage 320, or the execute stage 330. In particular embodiments, processing during the pre-fetch stage 310 includes speculative addressing for the set of instructions 312-316 and may be performed by the apparatus 10 of FIG. 1 or the apparatus 200 of FIG. 2.

During the first time period (T1) 340, the fetch stage 320 and the execute stage 330 may be idle. In the pre-fetch stage 310 of processing during the first time period (T1) 340, a method 372 of performing speculative addressing for the first instruction 312 may be performed using a PCB. A determination is made whether the first instruction 312 has an entry within the PCB, at 342. For example, the apparatus 100 of FIG. 1 may determine whether the first instruction 312 has an entry within the PCB 120. The apparatus 100 may determine whether the first instruction 312 has an entry by determining whether one of the virtual addresses 122-126 of the PCB entries 112-116 matches a virtual address of the first instruction 312.

A particular physical address is selected from the PCB when the first instruction 312 has an entry within the PCB, at 344. For example, the apparatus 100 of FIG. 1 may select one of the physical addresses 132-136 from the PCB 120 corresponding to one of the PCB entries 112-116 that matches the first instruction 312. Based on a particular PCB entry of the PCB entries 112-116 matching the first instruction 312, the apparatus 100 may control the MUX 140 to select the particular physical address corresponding to particular PCB entry. The PCB may have an entry matching the first instruction 312 when the second instruction 314 to be processed after the first instruction 312 has been predicted to cause a processing delay (e.g. an instruction fetch replay). To illustrate, the second instruction 314 may be located on different memory page than the first instruction 312, such that a memory page boundary separates the first instruction 312 from the second instruction 314. An instruction fetch replay may occur when the second instruction 314 is accessed without performing speculative addressing using the PCB. Thus, the particular physical address selected from the PCB 120 may be a speculative physical address of the second instruction 314 that may be located on a different memory page than the first instruction 312.

A tag array operation is performed with the selected physical address, at 346. The selected physical address corresponds to the physical address selected from an entry of the PCB that has the first instruction. For example, the instruction cache tag array 150 may perform a tag array operation in response to the selected physical address corresponding to the second instruction 314 output from the MUX 140. The tag array operation may be speculative because the selected physical address may be a speculative physical address. Performing a tag array operation based on a speculative physical address for the second instruction 314 during the pre-fetch stage 310 may reduce delays associated with processing the second instruction 314. For example, during the second time period (T2) 350 when the second instruction 314 is processed in the fetch stage 320, the apparatus 100 may avoid an instruction fetch replay for the second instruction 314 based on an incorrect physical address of the second instruction 314. The Last PA may be updated with the selected physical address, at 348.

During the second time period (T2) 350, the fetch stage 320 performs fetching of the first instruction 312. The execute stage 330 may remain idle. Processing in the fetch stage 320 may speed-up due to speculative addressing being performed using the PCB in the pre-fetch stage 310 during the first time period (T1) 340. The speed-up may occur because an instruction cache tag array operation may not be performed during the second time period (T2) 350. In the pre-fetch stage 310 of processing during the second time period (T2) 350, speculative addressing for the second instruction 314 using a PCB may be performed according to a method 382.

A determination is made whether the second instruction 314 has an entry within a PCB, at 352. For example, the apparatus 100 of FIG. 1 may determine whether the second instruction 314 has an entry with the PCB 120. The PCB used to perform speculative addressing for the second instruction 314 may correspond to the PCB (e.g., the PCB 120) that is accessed according to the method 372 performed in the pre-fetch stage 310 during the first time period (T1) 340. The apparatus 100 may determine whether the second instruction 314 has an entry within the PCB 120 by determining whether one of the virtual addresses 122-126 of the PCB entries 112-116 matches a virtual address of the second instruction 314.

A physical address is selected from a last physical address buffer when the PCB does not have an entry corresponding to the second instruction 314, at 354. The PCB may not have an entry corresponding to the second instruction 314 when the third instruction 316 is located within the same memory page as the second instruction 314. Stated differently, the second instruction 314 may not be separated from the third instruction 316 by a memory page boundary. As such, speculative addressing may not be performed using the PCB because a next instruction, such as the third instruction 316, has not been predicted to cause a processing delay due to accessibility to the third instruction 316 involving crossing a memory page boundary. Thus, the physical address is selected from the last physical address buffer when the third instruction 316 is not predicted to cause a processing delay.

In one example, the apparatus 100 of FIG. 1 may select a physical address for the third instruction 316 from the Last PA buffer 130 when the PCB 120 does not have an entry corresponding to the second instruction 314. The apparatus 100 may control the MUX 140 to select the physical address for the third instruction 316 from the Last PA buffer 130. The PCB 120 may have an entry with the second instruction 314 when the third instruction 316 to be processed after the second instruction 314 has been predicted to cause a processing delay.

A tag array operation is performed with the selected physical address, at 356. For example, the instruction cache tag array 150 may perform a tag array operation with the selected physical address that corresponds to the third instruction 316 output from the MUX 140. The selected physical address may correspond to the Last PA 148 stored in the Last PA Buffer 130. The selected physical address may be used to locate a tag array corresponding to the third instruction 316.

During the third time period (T3) 360, the fetch stage 320 performs fetching of the second instruction 314. The execute stage 330 executes the first instruction 312. Processing in the fetch stage 320 may speed-up due to speculative addressing being performed using the PCB in the pre-fetch stage 310 during the first time period (T1) 340. The speed-up may occur because an instruction cache tag array operation was performed in the pre-fetch stage 310 for the second instruction 314 using a speculative physical address obtained from the PCB. As a result, in the fetch stage 320 during the third time period (T3) 360, an instruction cache tag array operation may not be performed for the second instruction 314. In the pre-fetch stage 310 of processing during the third time period (T3) 360, speculative addressing for the third instruction 316 using a PCB may be performed according to a method 392.

A determination is made whether the third instruction 316 has an entry within the PCB, at 362. For example, the apparatus 100 of FIG. 1 may determine whether the third instruction 316 has an entry with the PCB 120. The PCB used to perform speculative addressing for a fourth instruction may correspond to the PCB (e.g., the PCB 120) that is accessed according to the method 382 performed in the pre-fetch stage 310 during the second time period (T2) 350. The apparatus 100 may determine whether the third instruction 316 has an entry within the PCB 120 by determining whether one of the virtual addresses 122-126 of the PCB entries 112-116 matches a virtual address of the third instruction 316.

A physical address is selected from a last physical address buffer when the PCB does not have an entry corresponding to the third instruction 316, at 364. For example, the apparatus 100 may select a physical address for the third instruction 316 from the Last PA buffer 130 when the PCB 120 does not have an entry corresponding to the third instruction 314. The apparatus 100 may control the MUX 140 to select the physical address from the Last PA Buffer 130. The PCB 120 may have an entry with the third instruction 316 when the fourth instruction to he processed after the third instruction 316 has been predicted to cause a processing delay.

A tag array operation is performed with the selected physical address, at 366. For example, the instruction cache tag array 150 may perform a tag array operation with the selected physical address output corresponding to the fourth instruction output from the MUX 140. The selected physical address may correspond to the Last PA 148 stored in the Last PA Buffer 130. The selected physical address may be used to locate a tag array corresponding to the fourth instruction.

Figure 4:
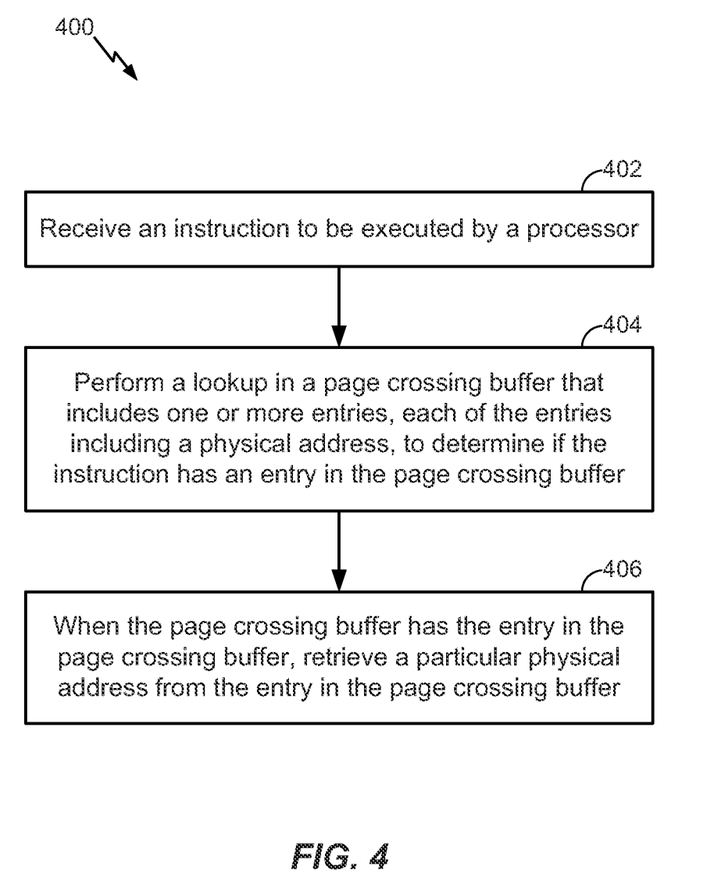
FIG. 4 is a flow chart of a first particular embodiment of a method to perform speculative addressing using a page crossing buffer.

Referring to FIG. 4, a flow chart of a first particular embodiment of a method 400 to perform speculative addressing using a page crossing buffer is illustrated. As an illustrative example, the method 400 may be performed by the apparatus 100 of FIG. 1 or the apparatus 200 of FIG. 2.

An instruction is received to be executed by a processor, at 402. For example, the apparatus 100 of FIG. 1 may receive the first instruction 110 to be executed by a processor.

A lookup in a page crossing buffer that includes one or more entries, each of the entries including a physical address, is performed to determine if the instruction has an entry in the page crossing buffer, at 404. For example, the apparatus 100 of FIG. 1 may perform a lookup in the PCB 120 to determine if the first instruction 110 has an entry (e.g., the first PCB entry 112, the second PCB entry 114, or the third PCB entry 116) in the PCB 120. The apparatus 100 may determine whether the first instruction 110 has an entry in the PCB 120 by determining whether a virtual address of the first instruction 110 matches one of the virtual addresses 122-126 corresponding to one of the PCB entries 112-116. The first instruction 110 may have an entry when the virtual address of the first instruction 110 matches one of the virtual addresses 122-126 corresponding to one of the PCB entries 112-116.

When the page crossing buffer has the entry in the page crossing buffer, a particular physical address is retrieved from the entry in the page crossing buffer, at 406. For example, when a one of the PCB entries 112-116 has a particular PCB entry having a virtual address (e.g., one of the virtual addresses 122-126) that matches the virtual address of the first instruction 110, the apparatus 100 of FIG. 1 controls the MUX 140 to retrieve a particular physical address from the entry in the PCB 120.

The method 400 enables reduction of potential delays by accessing the page crossing buffer to retrieve a physical address of a next instruction. Speculative pre-fetching may be performed more accurately than based only on a last physical address. As a result, processing delays may be reduced.

Figure 5:
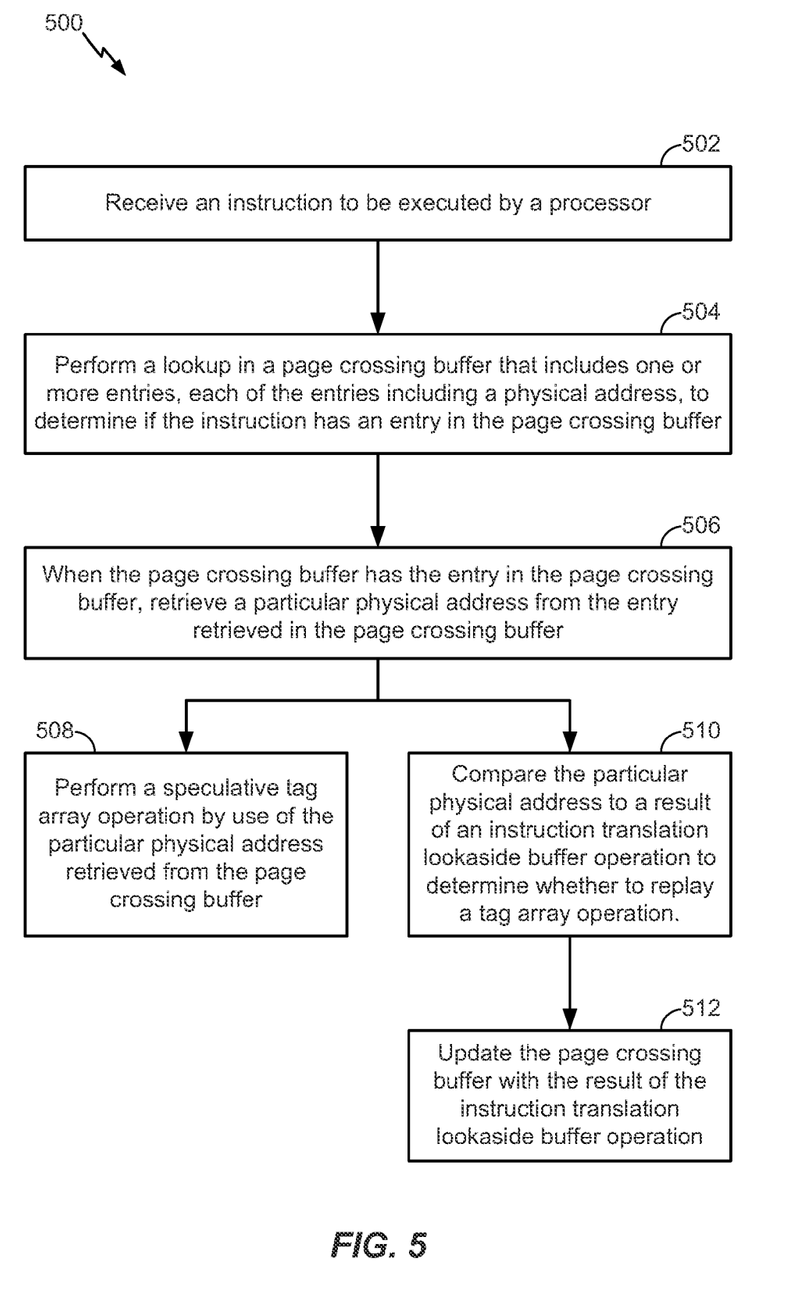
FIG. 5 is a flow chart of a second particular embodiment of a method to perform speculative addressing using a page crossing buffer.

Referring to FIG. 5, a flow chart of a second particular embodiment of a method 500 to perform speculative addressing using a page crossing buffer is illustrated. As an example, the method 500 may be performed by the apparatus 100 of FIG. 1 or the apparatus 200 of FIG. 2.

An instruction is received to be executed by a processor, at 502. For example, the apparatus 200 of FIG. 2 may receive the first instruction 110 to be executed by a processor.

A lookup in a page crossing buffer that includes one or more entries, each of the entries including a physical address, is performed to determine if the instruction has an entry in the page crossing buffer, at 504. For example, the apparatus 200 of FIG. 2 may perform a lookup in the PCB 120 to determine if the first instruction 110 has an entry (e.g., the first PCB entry 112, the second PCB entry 114, or the third PCB entry 116) in the PCB 120. The apparatus 200 may determine whether the first instruction 110 has an entry in the PCB 120 by determining whether a virtual address of the first instruction 110 matches one of the virtual addresses 122-126 corresponding to one of the PCB entries 112-116. The first instruction 110 may have an entry when the virtual address of the first instruction 110 matches one of the virtual addresses 122-126 corresponding to one of the PCB entries 112-116.

When the page crossing buffer has the entry in the page crossing buffer, a particular physical address is retrieved from the entry in the page crossing buffer, at 506. For example, when the PCB 104 of FIG. 2 has a particular PCB entry having a virtual address (e.g., one of the virtual addresses 122-126) that matches the virtual address of the first instruction 110, the apparatus 200 of FIG. 2 may control the 140 to retrieve a particular physical address 128 from the entry in the PCB 120.

A speculative tag array operation may be performed by use of the particular physical address retrieved from the page crossing buffer, at 508. For example, the instruction cache tag array 150 may perform a speculative tag array operation using the particular physical address retrieved from the PCB 120 (e.g., the speculative second instruction physical address 142).

The particular physical address may be compared to a result of an instruction lookaside buffer operation to determine whether to replay a tag array operation, at 510. For example, the comparator 260 may compare the particular physical address to a result of an instruction lookaside buffer operation performed by the ITLB 270 to determine whether to replay a tag array operation. The result of the instruction lookaside buffer operation may correspond to a valid physical address of the second instruction 212 to be executed after the first instruction 110. The comparator 260 may perform a comparison of the output 218 (corresponding to a valid physical address of the second instruction 212) to the speculative second instruction physical address 142. The speculative second instruction physical address 142 may correspond to the particular physical address 128 selected from the entry retrieved from the PCB 120. The output 268 of the comparator may indicate whether the speculative second instruction physical address 142 is valid. Based on whether the output 268 indicates that the speculative second instruction physical address 142 is valid, the apparatus 200 may determine whether to replay a tag array operation performed by the instruction cache tag array 150 for the second instruction 212.

The page crossing buffer may be updated with the result of the instruction translation lookaside buffer operation, at 512. For example, the apparatus 200 of FIG. 2 may update the PCB 120 with a result corresponding to the output 218 of the ITLB operation for the second instruction 212. For example, one of the PCB entries 112-116 may be updated such that the result of the ITLB operation is stored as the physical address corresponding to one of the PCB entries 112-116 having the virtual address of the first instruction 110.

Figure 6:
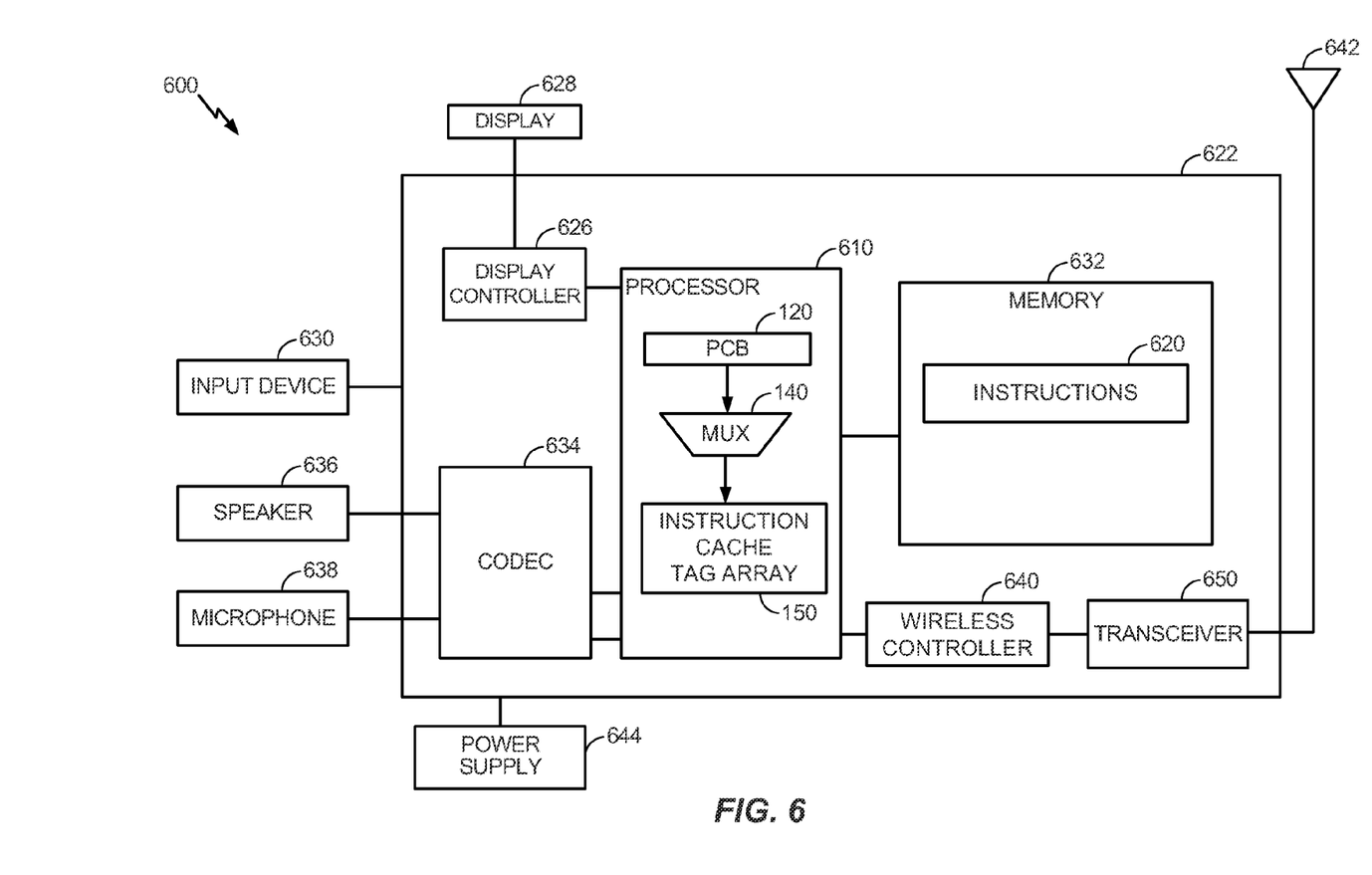
FIG. 6 is a block diagram of a wireless electronic device including components that are operable to perform speculative addressing using a page crossing buffer.

FIG. 6 is a block diagram of a wireless electronic device 600 including components that are operable to perform speculative addressing using a page crossing buffer. The wireless electronic device 600 includes a processor 610 coupled to a memory 632. In an illustrative example, the wireless electronic device 600 may include the apparatus 100 of FIG. 1, the apparatus 200 of FIG. 2, or components thereof. The wireless electronic device 600 may operate according to the methods or functions described with reference to FIGS. 1-5.

The processor 610 may include or implement the PCB 120 of FIG. 1, the Last PA 130 of FIG. 1, the MUX 140 of FIG. 1, the instruction cache tag array 150 of FIG. 1, or a combination thereof. For example, modules may be integrated into the processor 610 and may include dedicated circuitry or other logic to perform at least a portion of the functionality described with reference to FIGS. 1-5.

The memory 632 may be a non-transitory, tangible computer-readable and/or processor-readable storage device that stores instructions 620. The instructions 620 may be executable by the processor 610 to implement the PCB 120 of FIG. 1, the Last PA buffer 130 of FIG. 1, the MUX 140 of FIG. 1, the instruction cache tag array 150 of FIG. 1, or a combination thereof. For example, the instructions 620 may include instructions that may be executable by the processor 610 to perform one or more functions or methods described with respect to the PCB 120 of FIG. 1, the Last PA buffer 130 of FIG. 1, the MUX 140 of FIG. 1, the instruction cache tag array 150 of FIG. 1, or a combination thereof. The instructions 620 may include instructions that are executable by the processor 610 to cause the processor 610 to perform one or more functions or methods described with reference to FIGS. 1-2, the method 372 of FIG. 3, the method 382 of FIG. 3, the method 392 of FIG. 3, the method 400 of FIG. 4, the method 500 of FIG. 5, or a combination thereof. To illustrate, the instructions 620 may include code to perform speculative addressing using the PCB 120 of FIG. 1. The memory 632 may include the PCB 120 of FIG. 1. The memory 632 may include the Last PA buffer 130 of FIG. 1. In other embodiments, one or more functions described herein as being performed by the processor 610 executing instructions from the memory 632 may instead be performed by dedicated hardware (e.g., a programmable logic arrays, a FPGA device, an ASIC, or a processing unit programmed to perform identified functions, such as a CPU, a DSP, a microprocessor, an ARM processor, a controller, another hardware device, or a firmware device, or any combination thereof).

FIG. 6 also shows a display controller 626 that is coupled to the processor 610 and to a display 628. A coder/decoder (CODEC) 634 can also be coupled to the processor 610. A speaker 636 and a microphone 638 can be coupled to the CODEC 634.

FIG. 6 also indicates that a wireless controller 640 can be coupled to the processor 610, where the wireless controller 640 is in communication with an antenna 642 via a transceiver 650. The wireless controller 640, the transceiver 650, and the antenna 642 may thus represent a wireless interface that enables wireless communication by the mobile communication device 600. The wireless electronic device 600 may include numerous wireless interfaces, where different wireless networks are configured to support different networking technologies or combinations of networking technologies.

In a particular embodiment, the processor 610, the memory 632, the display controller 626, the CODEC 634, the wireless controller 640, and the transceiver 650 are included in a system-in-package or system-on-chip device 622. In a particular embodiment, an input device 630 and a power supply 644 are coupled to the system-on-chip device 622. Moreover, in a particular embodiment, as illustrated in FIG. 6, the input device 630, the speaker 636, the microphone 638, the antenna 642, and the power supply 644 are external to the system-on-chip device 622. However, each of the input device 630, the speaker 636, the microphone 638, the antenna 642, and the power supply 644 can be coupled to a component of the system-on-chip device 622, such as an interface or a controller.

It should be noted that although FIG. 6 depicts a wireless electronic device, the processor 610 and the memory 632 may be integrated into other devices, such as a multimedia player, an entertainment unit, a navigation device, a personal digital assistant (PDA), a mobile personal computer, a smart phone, a fixed location data unit, a computing device (e.g., a computing device, a tablet computing device, a laptop computing device, a desktop computing device, etc.), a media device, or another device configured to process image data.

In conjunction with the described systems and methods, an apparatus is disclosed for performing speculative addressing using a page crossing buffer. The apparatus includes means for storing one or more entries, each of the one or more entries including a physical address. For example the means for storing one or more entries may include the processor 610, the memory 632, the PCB 120 of FIG. 1, another device configured to store one or more entries that each include a physical address, or any combination thereof. The apparatus includes means for selecting an address that corresponds to a particular physical address retrieved from the means for storing in response to the means for storing having an entry corresponding to a particular instruction. For example, the means for selecting may include the processor 610, the MUX 140 of FIG. 1, another device configured to select an address, or a combination thereof. An output of the means for selecting an address is provided to means for performing a tag array operation. The means for performing a tag array operation may be configured to perform a speculative tag array operation using the particular physical address retrieved from the means for storing. For example, the means for performing the tag array operation may be the instruction cache tag array 150 of FIG. 1 or FIG. 2 or any other device configured to perform a tag array operation.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in the ASIC. The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
   receiving an instruction of a sequence of instructions to be executed by a processor, each of the instructions stored in memory;

performing a lookup in a page crossing buffer to determine whether the page crossing buffer has an associated entry corresponding to the instruction, the page crossing buffer configured to store one or more entries, each of the one or more entries including an instruction address of a particular instruction and a physical address that corresponds to a next sequential instruction that follows the particular instruction in the sequence of instructions; and based on a determination that the page crossing buffer has the associated entry corresponding to the instruction:
selecting a first physical address retrieved from the associated entry in the page crossing buffer, the first physical address corresponding to a second instruction that follows the instruction in the sequence of instructions; and
performing a tag array operation based on the selected first physical address to locate a tag array entry corresponding to the second instruction.

2. The method of claim 1, wherein the instruction address and the physical address of each entry in the page crossing buffer correspond, respectively, to a first memory page and a second memory page that is distinct from the first memory page.

3. The method of claim 1, wherein the instruction address and the physical address of each entry in the page crossing buffer identify a first corresponding instruction and a second corresponding instruction, respectively, and wherein the first corresponding instruction and the second corresponding instruction are located at sequential memory addresses.

4. The method of claim 1, further comprising storing a result of an instruction translation lookaside buffer operation in a last physical address buffer.

5. The method of claim 4, further comprising selecting a last physical address from the last physical address buffer based on a determination that the page crossing buffer does not have any entry corresponding to the instruction.

6. The method of claim 1, further comprising retrieving a cache line corresponding to the first physical address during a pre-fetch stage.

7. The method of claim 1, wherein the instruction address of the particular instruction identifies a virtual address of the instruction, wherein the tag array operation comprises performing speculative addressing for the instruction at a pre-fetch stage of processing during a first time period, wherein the first time period is before a second time period during which speculative addressing is performed for the second instruction at the pre-fetch stage of processing, and further comprising performing fetching of the instruction at a fetch stage of processing during the second time period.

8. The method of claim 7, further comprising:
comparing the first physical address to a result of an instruction translation lookaside buffer operation to determine whether to replay the tag array operation; and
updating the page crossing buffer with the result of the instruction translation lookaside buffer operation.

9. The method of claim 1, wherein the first physical address is read from the associated entry prior to a fetch stage of a processing pipeline.

10. The method of claim 3, wherein the instruction is located at a last address of a first memory page, and wherein the second instruction is located at a first address of a next memory page.

11. An apparatus comprising:
a page crossing buffer configured to store one or more entries, each of the one or more entries including an instruction address of a particular instruction and a physical address that corresponds to a next sequential instruction that follows the particular instruction in a sequence of instructions stored in memory;
a multiplexer configured to select a first physical address based on a determination that the page crossing buffer includes an entry corresponding to an instruction, the first physical address retrieved from the entry in the page crossing buffer, and the first physical address corresponding to a second instruction that follows the instruction in the sequence of instructions; and
a tag array configured to perform a tag array operation based on the selected first physical address to locate a tag array entry corresponding to the second instruction.

12. The apparatus of claim 11, wherein a result of an instruction translation lookaside buffer operation is stored in a last physical address buffer, and wherein the multiplexer is further configured to select an output of the last physical address buffer based on a determination that the page crossing buffer does not have any entry corresponding to the instruction.

13. The apparatus of claim 12, wherein the tag array is configured to perform a tag array operation with the output of the last physical address buffer that is selected by the multiplexer.

14. The apparatus of claim 11, further comprising a comparator configured to compare the first physical address to a result of an instruction translation lookaside buffer operation to determine whether to replay the tag array operation.

15. The apparatus of claim 14, wherein the page crossing buffer is updated with the result of the instruction translation lookaside buffer operation.

16. The apparatus of claim 14, wherein a last physical address buffer stores the first physical address when a result of the comparator and the result of the instruction translation lookaside buffer operation are identical.

17. The apparatus of claim 16, wherein the instruction address and the physical address of each entry in the page crossing buffer correspond, respectively, to a first memory page and a second memory page that is distinct from the first memory page.

18. The apparatus of claim 11, wherein the tag array is configured to perform the tag array operation prior to a fetch stage of a processing pipeline, the tag array operation using the first physical address retrieved from the page crossing buffer.

19. An apparatus comprising:
means for storing one or more entries, each of the one or more entries including an instruction address associated with a particular instruction and a physical address that corresponds to a next sequential instruction that follows the particular instruction in a sequence of instructions;
means for selecting a first physical address in response to a determination that the means for storing includes an associated entry corresponding to an instruction of the sequence of instructions, the first physical address retrieved from the associated entry in the means for storing, and the first physical address corresponding to a second instruction that follows the instruction in the sequence of instructions; and
means for performing a tag array operation based on the selected first physical address to locate a tag array entry corresponding to the second instruction.

20. The apparatus of claim 19, wherein the means for performing a tag array operation is configured to perform the tag array operation prior to a fetch stage of a processing pipeline, the tag array operation using the first physical address retrieved from the means for storing.

21. A non-transitory computer readable storage medium storing instructions that are executable within a processing system to:
cause the processing system to receive an instruction of a sequence of instructions for execution, each of the sequence of instructions stored in memory;
perform a lookup in a page crossing buffer to determine whether the page crossing buffer has an associated entry corresponding to the instruction, the page crossing buffer includes one or more entries, each of the one or more entries including an instruction address of a particular instruction and a physical address that corresponds to a next sequential instruction that follows the particular instruction in the sequence of instructions; and
based on a determination that the page crossing buffer has an associated entry corresponding to the instruction:
select a first physical address retrieved from the associated entry in the page crossing buffer, the first physical address corresponding to a second instruction that follows the instruction in the sequence of instructions; and
perform a tag array operation based on the selected first physical address to locate a tag array entry corresponding to the second instruction.

22. The computer readable storage medium of claim 21, wherein the instruction address and the physical address of each entry in the page crossing buffer correspond, respectively, to a first memory page and a second memory page that is distinct from the first memory page.

23. The apparatus of claim 11, wherein the instruction address and the physical address of the entry identify a first instruction and a second instruction, respectively, and wherein the first instruction and the second instruction are located at sequential memory addresses.

24. The apparatus of claim 23, wherein the first instruction is located at a last address of a first memory page, and wherein the second instruction is located at a first address of a next memory page.

\* \* \* \* \*